(12) United States Patent
Reinhardt et al.

(10) Patent No.: US 11,084,067 B2
(45) Date of Patent: Aug. 10, 2021

(54) MOBILE DECONTAMINATION SYSTEM

(71) Applicant: Kaercher Futuretech GmbH, Schwaikheim (DE)

(72) Inventors: Ulli Reinhardt, Backnang (DE); Michael Spaan, Magstadt (DE); Daniel Fritz, Berglen (DE); Markus Hellmuth, Stuttgart (DE)

(73) Assignee: Kaercher Futuretech GmbH, Schwaikheim (DE)

( * ) Notice: Subject to any disclaimer, the term of this patent is extended or adjusted under 35 U.S.C. 154(b) by 185 days.

(21) Appl. No.: 16/434,635

(22) Filed: Jun. 7, 2019

(65) Prior Publication Data
US 2019/0299256 A1 Oct. 3, 2019

Related U.S. Application Data

(63) Continuation of application No. PCT/EP2016/080652, filed on Dec. 12, 2016.

(51) Int. Cl.
*B08B 3/08* (2006.01)
*B08B 3/02* (2006.01)
(Continued)

(52) U.S. Cl.
CPC ............... *B08B 3/08* (2013.01); *B08B 3/026* (2013.01); *B08B 3/106* (2013.01);
(Continued)

(58) Field of Classification Search
CPC .......... B08B 3/08; B08B 3/026; B08B 3/106; B08B 2203/007; B08B 2203/0223;
(Continued)

(56) References Cited

U.S. PATENT DOCUMENTS

| 4,805,653 A | * | 2/1989 | Krajicek | F28G 1/16 |
| | | | | 134/166 C |
| 5,976,268 A | * | 11/1999 | Eliason | B08B 3/006 |
| | | | | 134/10 |

FOREIGN PATENT DOCUMENTS

| CN | 202692101 U | 1/2013 |
| CN | 203954239 U | 11/2014 |

(Continued)

OTHER PUBLICATIONS

DE102004047225A1—Machine translation (Year: 2004).*
(Continued)

*Primary Examiner* — Tinsae B Ayalew
(74) *Attorney, Agent, or Firm* — Jason H. Vick; Sheridan Ross, PC

(57) ABSTRACT

A mobile decontamination system has an internal combustion engine, a generator, a first pump, a boiler and a second pump. The engine is coupled to the generator and to the first pump. The first pump is designed for discharging a first decontamination medium via a first spray lance. The second pump is designed for discharging a second decontamination medium via a second spray lance. A system controller is designed for selectively operating the first pump and the heating boiler in one of at least two different operating modes. In the first operating mode, the first pump delivers a first volumetric flow through the boiler which is at such a high level that the first decontamination medium is in liquid form. In a second operating mode, the first pump delivers a second volumetric flow through the boiler which is at such a low level that the first decontamination medium transfers into gaseous form.

19 Claims, 5 Drawing Sheets

(51) Int. Cl.
*B08B 3/10* (2006.01)
*B60P 3/00* (2006.01)

(52) U.S. Cl.
CPC . *B08B 2203/007* (2013.01); *B08B 2203/0223* (2013.01); *B08B 2203/0241* (2013.01); *B08B 2203/0258* (2013.01); *B08B 2203/0282* (2013.01); *B08B 2230/01* (2013.01); *B60P 3/005* (2013.01)

(58) Field of Classification Search
CPC .... B08B 2203/0241; B08B 2203/0258; B08B 2203/0282; B08B 2230/01; B60P 3/005
USPC ........................................................ 134/99.2
See application file for complete search history.

(56) References Cited

FOREIGN PATENT DOCUMENTS

DE       4414971 C1    4/1995
DE   102004047225 A1    3/2006

OTHER PUBLICATIONS

DE4414971C1—Machine translation (Year: 1995).*
International Search Report for International Application No. PCT/EP2016/080652, dated Oct. 6, 2017.
Written Opinion for International Application No. PCT/EP2016/080652, dated Oct. 6, 2017.
International Preliminary Report on Patentability for International Application No. PCT/EP2016/080652, dated Jun. 27, 2019.
Taiwan Examination Report for corresponding Taiwan Application No. 106141765, dated Jan. 13, 2021.

* cited by examiner

MOBILE DECONTAMINATION SYSTEM

CROSS REFERENCES TO RELATED APPLICATIONS

This application is a continuation of international patent application PCT/EP2016/080652 filed on Dec. 12, 2016 designating the U.S. The entire content of this prior application is incorporated herein by reference.

BACKGROUND

The present invention relates to a multifunctional mobile decontamination system for detoxification, disinfection and/or radiological decontamination of people, objects and/or regions.

The term "decontaminating" is a technical term for systematic elimination and/or rendering harmless of radioactive, biological or chemical substances which, without such measures, pose a risk to the health and even life of people. Such substances may be the result of military usage of radioactive/nuclear, biological or chemical weapons or the result of corresponding terror attacks. Such substances can also lead to contamination of people, objects and regions in the event of civil accidents, e.g. in the event of an accident in a chemical factory or a nuclear power plant. Measures for decontamination include radiological decontamination, disinfection and detoxification, wherein different decontamination media and different procedures may be used depending on the type of decontamination. By way of example, aqueous or non-aqueous decontamination agents, superheated steam or a combination of such decontamination media may be used.

In real life scenarios, it may often be necessary to remove "normal" dirt before or during a decontamination process, and/or it may be necessary to remove the decontamination agent from people or objects after application. Accordingly, there is a desire for a multifunctional mobile decontamination system that is further capable of "normal" cleaning of people and/or objects.

German published patent application DE 10 2004 047 225 A1 discloses a mobile decontamination and cleaning device with a space frame in which are arranged an internal combustion engine, an electric generator driven by the internal combustion engine, a high-pressure liquid pump, a burner and, optionally, an air compressor. An external barrel pump can be operated via the generator and can be mounted at the opening of a container, designed as a barrel, for a decontamination agent. The known decontamination device enables a mobile operation and a plurality of different decontamination tasks. By means of the high-pressure liquid pump and/or by means of the barrel pump a respectively suitable liquid decontamination medium can be selectively discharged. The compressor serves for foaming a decontamination medium from the external container. In order to be driven, the high-pressure liquid pump, the generator and the optional compressor each are coupled to the engine shaft via a connectable belt drive. Production of superheated steam as decontamination medium is not possible with this decontamination device. Nor is a multiple operation provided, in which a plurality of decontamination media can be discharged in parallel with each other.

SUMMARY

Against this background, it is an object of the present disclosure to provide a multifunctional mobile decontamination system which enables an even more variable and versatile use. It is another object to provide a multifunctional mobile decontamination system having a compact type of construction.

According to an aspect of the disclosure, there is provided mobile decontamination system for at least one of detoxification, disinfection or radiological decontamination, comprising a first spray lance and a second spray lance, comprising an internal combustion engine having an engine housing and an engine shaft, comprising a generator coupled to the engine shaft in order to generate electric power, comprising a boiler designed for heating a first decontamination medium, the boiler having a defined heat output, comprising a first pump coupled to the engine shaft and designed for discharging the first decontamination medium from the boiler via the first spray lance, comprising a second pump designed for discharging a second decontamination medium via the second spray lance, and comprising a system controller designed for selectively operating the first pump and the boiler in one of at least two different operating modes, wherein the first pump in the first operating mode produces a first volumetric flow of the first decontamination medium through the boiler, said first volumetric flow being at such a high level that the first decontamination medium is in liquid form at the defined heat output, and wherein the first pump in the second operating mode produces a second volumetric flow of the first decontamination medium through the boiler, which second volumetric flow is at such a low level that the first decontamination medium transfers into gaseous form at the defined heat output.

Exemplary embodiments of the novel decontamination system may have an extended range of functions since in the second operating mode a decontamination, especially a disinfection, is possible using superheated steam, the production of which is essentially controlled via the volumetric flow with which the first pump delivers the first decontamination medium. A higher volumetric flow results in the residence time of the decontamination medium in the boiler being relatively short and in the decontamination medium not being heated above boiling point within the short residence time. Conversely, the residence time of the decontamination medium in the boiler in the case of a lower volumetric flow is higher and the decontamination medium can absorb more energy at the defined heat output and can therefore transfer into its gaseous phase. Preferably, the system controller may be designed for keeping the first decontamination medium in the boiler at a defined pressure using the first pump, which defined pressure causes the first decontamination medium to transfer into its gaseous phase in the second operating mode only when discharging from the spray lance, i.e. during an expansion.

In some preferred exemplary embodiments, the heat output may be produced by means of a burner, especially by means of a diesel burner and/or multifuel burner. The setting of the defined heat output may be carried out in a variable manner in some exemplary embodiments, which is why the system controller may be designed for not only varying the volumetric flow but also the heat output. In other exemplary embodiments, the heating boiler may have a fixed defined heat output and the system controller may alternate between the first and the second operating mode simply by adjusting the volumetric flow with the aid of the first pump. The first decontamination medium can be water, e.g. surface water, ground water and/or water carried along in a tank. Alternatively or additionally, the first decontamination medium may contain a chemical decontamination agent which may be discharged as an aqueous solution.

The novel decontamination system can provide an extended range of functions in a very simple manner. It also enables a very compact and robust type of construction which is well suited to a mobile use in a disaster-hit region.

In a preferred refinement, the decontamination system further has a connector arrangement with at least three connectors for spray lances, wherein a first connector is connected to the first pump and is designed for detachably connecting, and using, the first spray lance for the first operating mode, wherein a second connector is connected to the second pump and is designed for detachably connecting, and using, the second spray lance, and wherein an additional connector is connected to the first pump and is designed for connecting, and using, an additional spray lance for the second operating mode.

In this refinement, the decontamination system has at least three separate connectors for spray lances which are preferably arranged next to each other and/or above each other, forming a connector arrangement. Accordingly, there are at least two separate connectors provided for the first and the second operating mode of the first pump. In some exemplary embodiments, the system controller may be designed for selectively feeding the volumetric flow from the heating boiler to the first connector or to the additional connector in order to choose between the first and the second operating mode. In some exemplary embodiments, the change between the first and the second operating mode may be carried out by means of valves which selectively open or close the first connector and/or the additional connector.

Furthermore, the novel decontamination system may have a separate connector for the second spray lance, which may be connected to the second pump. This makes it possible to selectively connect the second spray lance in the same manner and in parallel to the first and/or to the additional spray lance. The refinement enables a very variable and also convenient operation. The refinement furthermore has the advantage that optimal spray lances and/or hosepipes for liquid or gaseous discharge of the first decontamination medium can be provided for each case.

In a further refinement, the decontamination system has at least two first connectors which are each connected to the first pump and are designed for selectively discharging the first decontamination medium via two first spray lances in parallel.

This refinement enables a more variable use of the novel decontamination system since discharge of the first decontamination medium—preferably in the first operating mode—is enabled in a parallel operation. The system controller is preferably designed for setting the volumetric flow in each of the two parallel line branches to a defined value so that the volumetric flow in the one branch can be maintained independently of the volumetric flow in the other branch. The refinement is particularly advantageous in order to enable a pre-cleaning and a post-cleaning with hot water or another water-based decontamination medium in an "assembly line operation" within a decontamination process. Preferably, all the aforesaid connectors form a common connector arrangement which facilitates a simple and robust operation under operating conditions.

In a further refinement, the second pump is connected to the second connector in an operationally detachable manner.

This refinement enables an operation for the second pump as an integral pump, i.e. via the second connector on the common connector arrangement, or separately from it, i.e. remotely from the engine and the first pump, according to choice. The refinement therefore enables a more variable operation under changing operating conditions. It is particularly advantageous if the second pump is to be operated in order to perform different decontamination tasks on one object or on different objects according to choice.

In a further refinement, the decontamination systems has a housing structure, especially a space frame, which defines an inner region, wherein the internal combustion engine, the boiler, the generator, the first pump and the second pump are arranged in the inner region. The system controller is preferably also arranged in the inner region.

The refinement integrates said components in a spatially compact manner and therefore enables a fast transporting to the operating site. Moreover, the components are protected again shocks, impacts and other loads during an operation or during transportation.

In a further refinement, the second pump is arranged in the inner region in an operationally detachable manner. In contrast to this, the internal combustion engine, the boiler, the generator and the first pump in the preferred exemplary embodiments are arranged in the inner region in an operationally permanent/fixed manner.

"Operationally detachable" means that the second pump during the designated operation of the decontamination system can be integrated into the inner region and connected there or can be removed from the inner region and operated separately according to choice. In preferred exemplary embodiments, the second pump is fastened inside the housing structure by means of reversibly detachable fastening elements such as snap-on connectors, screw connectors, plug-in connectors, latching connectors, clamping bands or a combination thereof if the decontamination system is intended for transporting and/or for use at a spatially tightly confined location. In contrast to this, the second pump may be removed from the inner region of the housing structure and set down remotely from the housing structure if a remote operation is desired at a plurality of operating sites. The refinement is particularly advantageous if the second pump, moreover, is connected to the second connector in an operationally detachable manner since this enables a very simple exchange of the second pump in dependence of the second decontamination medium being used. In particular, a respectively suitable special pump for selected decontamination media may therefore be integrated into the system in a simple manner. In some preferred exemplary embodiments, the decontamination system has a plurality of second pumps which differ with regard to their material properties and/or performance, wherein the system controller is designed for controlling a respective second pump from the plurality of second pumps in an operating mode. The novel decontamination system can therefore be individually adapted at the operating site to the decontamination task.

In a further refinement, the decontamination system has an operating panel detachably mounted on the housing structure and connected to the system controller in an operationally permanent manner via a cable.

In this refinement, the decontamination system may have an overlength cable between the operating panel and the system controller so that the operating panel may be used as a cable-routed remote control remotely from the housing structure. In principle, a wireless remote control would also be possible but the preferred refinement is more robust in realization. It increases flexibility of the novel decontamination system still further.

In a further refinement, the decontamination system has a first stackable transport container, in which the housing structure may be fastened, and a second stackable transport container of similar construction, in which a water tank may be arranged.

In this refinement, the housing structure, together with the function-defining units (internal combustion engine, generator, first and second pump, system controller, heating boiler), may be integrated into a modular container system, wherein the housing structure is maintained as such. Alternatively to this, the function-defining units, in other refinements without a housing structure, could be accommodated in the first transport container. In the preferred refinement, the housing structure is virtually "superfluous". The refinement, however, enables a rather cost-efficient implementation and also a once again more variable operation. On the one hand, the decontamination system of this refinement may be complemented by a transportable water tank in a very simple manner. In addition, this refinement facilitates the integration of the decontamination system into existing transport and container concepts.

In a further refinement, the system controller is designed for selectively operating the second pump in parallel with the first pump.

This refinement entails the internal combustion engine being designed for this parallel operation with regard to its performance. The refinement enables for example a pre-cleaning and post-cleaning using the first decontamination medium and also the actual decontamination using the second decontamination medium in the manner of an "assembly line operation". The refinement is therefore very advantageous for the decontamination of a plurality of people and/or objects.

In a further refinement, the second pump is an electrically operated chemical pump. It is designed in particular for delivering non-aqueous decontamination media. In some exemplary embodiments, the second pump has a mixing chamber in order to mix a plurality of constituents of the second decontamination medium according to requirement.

This refinement enables an autonomous operation of the novel decontamination system using the integrated generator, wherein the electrically operated chemical pump in addition to the first pump enables a wide range of decontamination media. The refinement is advantageous, moreover, because it enables the simple integration of special pumps for specific decontamination media. Referred to as a special pump in this context is a pump which is specially adapted to the second decontamination medium with regard to its construction and/or to the materials being used.

In a further refinement, the engine shaft is connected to the first pump on a first side of the engine housing and is connected to the generator on a second side of the engine housing, said second side facing away from the first side. The first and the second sides are preferably opposite sides of the engine housing so that the engine housing is spatially arranged between the generator and the first pump.

This refinement enables a very compact and robust implementation of the novel decontamination system. It makes it especially possible to drive both the generator and the first pump in a fixed manner by means of the one engine shaft. In some preferred exemplary embodiments, a speed reduction gear is arranged between the engine shaft and the first pump in order to reduce a higher engine rotational speed to a lower pump rotational speed and therefore to achieve an efficient operation of all the units.

In a further refinement, the generator, the engine shaft and the first pump are arranged along a common spatial axis. The generator and the first pump are preferably connected to the engine shaft in a beltless or chainless manner.

This refinement contributes to a very compact and robust type of construction and enables a high level of efficiency and also a low center of gravity. The latter is advantageous with regard to transportability of the novel decontamination system.

In a further refinement, the decontamination system has a gear via which the first pump is connected to the engine shaft, wherein the generator, the gear and the first pump may be arranged along a common spatial axis.

This refinement also advantageously contributes to a compact and robust type of construction with a low center of gravity.

In a further refinement, the decontamination system has a magnetic clutch via which the first pump is connected to the engine shaft, wherein the generator, the magnetic clutch and the first pump may be arranged along a common spatial axis.

This refinement contributes to a variable and efficient operation of the novel decontamination system since it makes it possible in a simple manner to operate the first pump and the second pump separately from each other. The maximum engine output can be made available to the first and/or to the second pump according to choice. The arrangement along the common spatial axis advantageously contributes to a compact and robust type of construction with a low center of gravity.

It is understood that the above-mentioned features and the features which are still to be explained below are not only usable in the respectively specified combination but also in other combinations or on their own without departing from the scope of the present invention.

BRIEF DESCRIPTION OF THE DRAWING

Exemplary embodiments are shown in the drawing and explained in more detail in the subsequent description. In the drawing.

EMBODIMENTS

Figure 1:
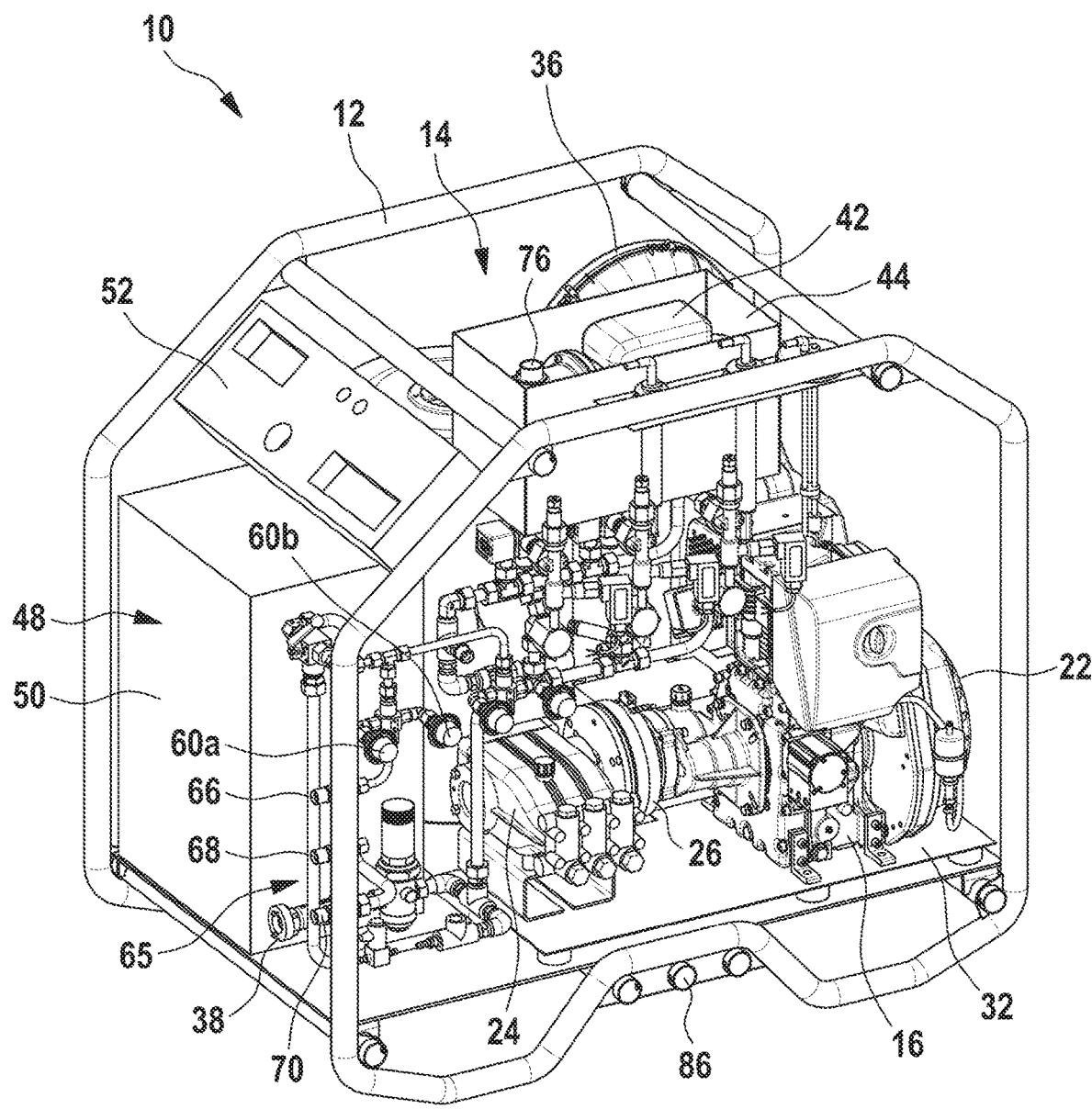
FIG. 1 shows an exemplary embodiment of the novel decontamination system, wherein some parts are not shown for reasons of clarity.

In FIGS. 1 to 5, an exemplary embodiment of the novel decontamination system is designated in its entirety by reference number 10. The decontamination system 10 has in this case a housing structure in the form of a tubular space frame 12 which defines an inner region 14. Arranged in this inner region is an engine 16 with an engine housing 18 and an engine shaft 20. In preferred exemplary embodiments, the engine 16 is an internal combustion engine designed for burning a plurality of different fuels, especially diesel or kerosene. In other exemplary embodiments, the engine 16 may be a diesel engine, a petrol engine or a gas-operated engine.

Arranged on a first side 21 of the engine housing, and coupled to the engine shaft 20, is a generator 22. In preferred exemplary embodiments, generator 22 is a permanent magnet generator, which delivers electrical power in the form of a three-phase alternating current, from which in a power box, explained further down below, a plurality of different currents and voltages are generated. In other exemplary embodiments, the generator may be a synchronous generator. Arranged on a second side 23 of the engine housing 18 is a first pump 24. In preferred exemplary embodiments, pump 24 is a high-pressure liquid pump which is able to discharge an aqueous decontamination medium at a pressure of up to 110 bar, preferably up to 300 bar, via a first spray lance (not shown here). In general, the first pump in the preferred exemplary embodiments is a high-pressure pump which is able to deliver a volumetric flow of more than 1500 l/h, preferably of up to 2000 l/h. In the preferred exemplary embodiment depicted here, first pump 24 is coupled to shaft 20 of engine 16 via a magnetic clutch 26 and a gear 28. In preferred exemplary embodiments, gear 28 is a speed reduction gear with a step-down ratio of 2:1. Magnetic clutch 26 may be designed for selectively coupling first pump 24 to engine shaft 20 in a torsionally fixed manner or selectively decoupling the first pump from engine shaft 20.

Figure 2:
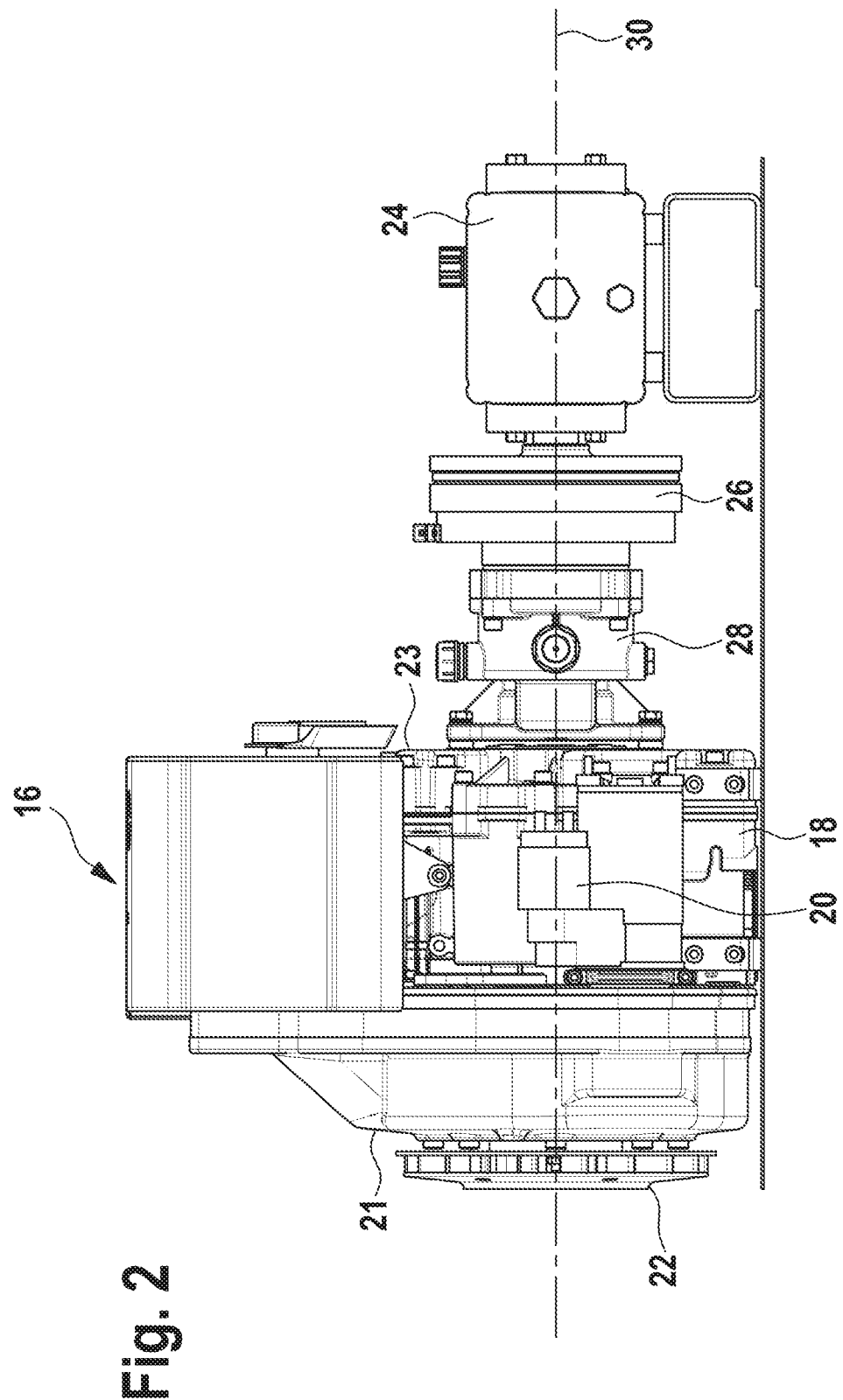
FIG. 2 shows the internal combustion engine, generator and the first pump from the exemplary embodiment according to FIG. 1.

As is shown in FIG. 2, generator 22, first pump 24, magnetic clutch 26 and gear 28 may be arranged along a common spatial axis 30 in preferred exemplary embodiments. Engine housing 18 may be arranged along the spatial axis 30 between generator 22 and pump 24. As can be seen from FIG. 1, the drive train thereby formed may be fastened on a baseplate 32 which in turn is arranged in the inner region 14 of tubular space frame 12.

Figure 3:
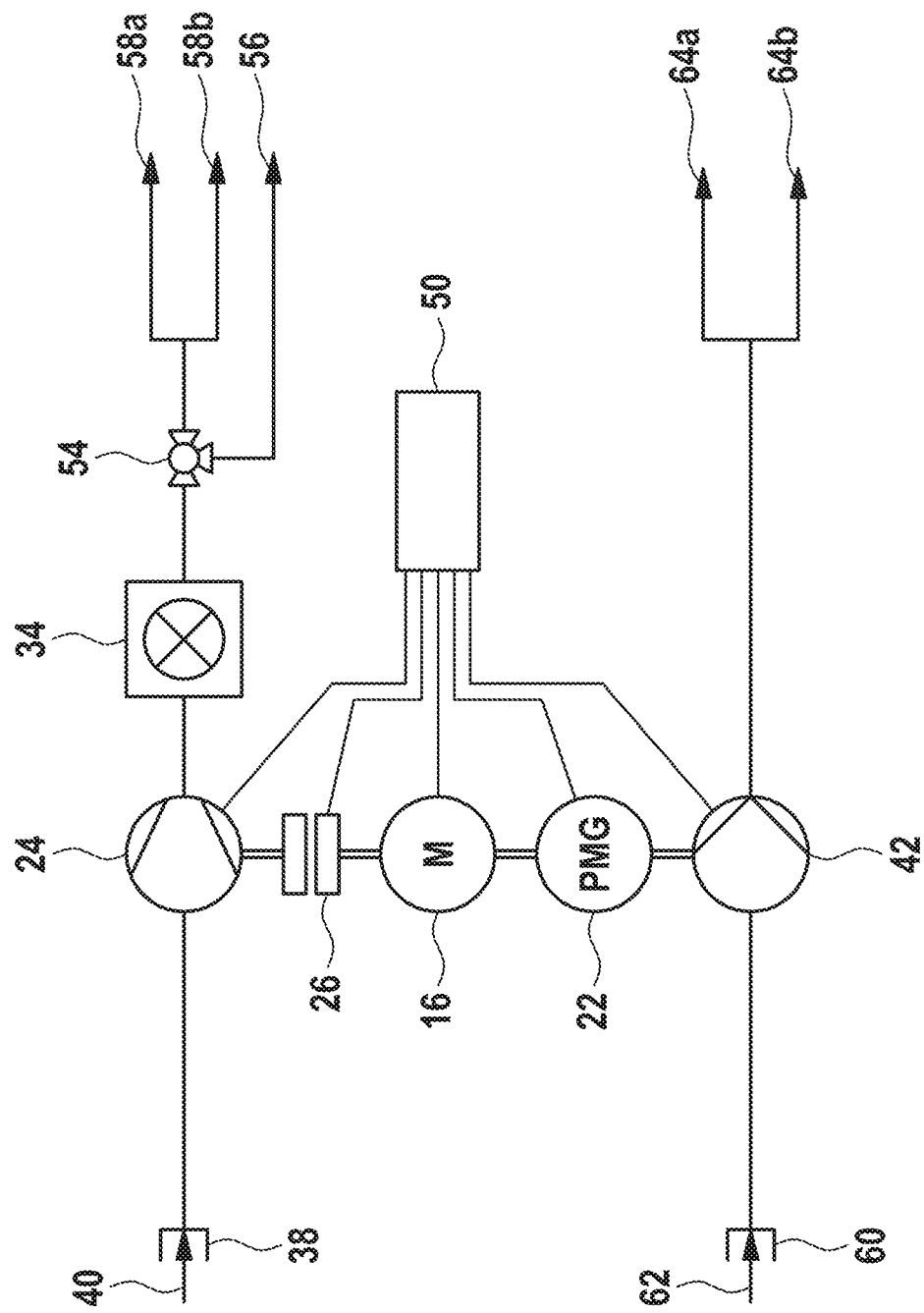
FIG. 3 shows a simplified flow diagram for the exemplary embodiment from FIG. 1.
Figure 4:
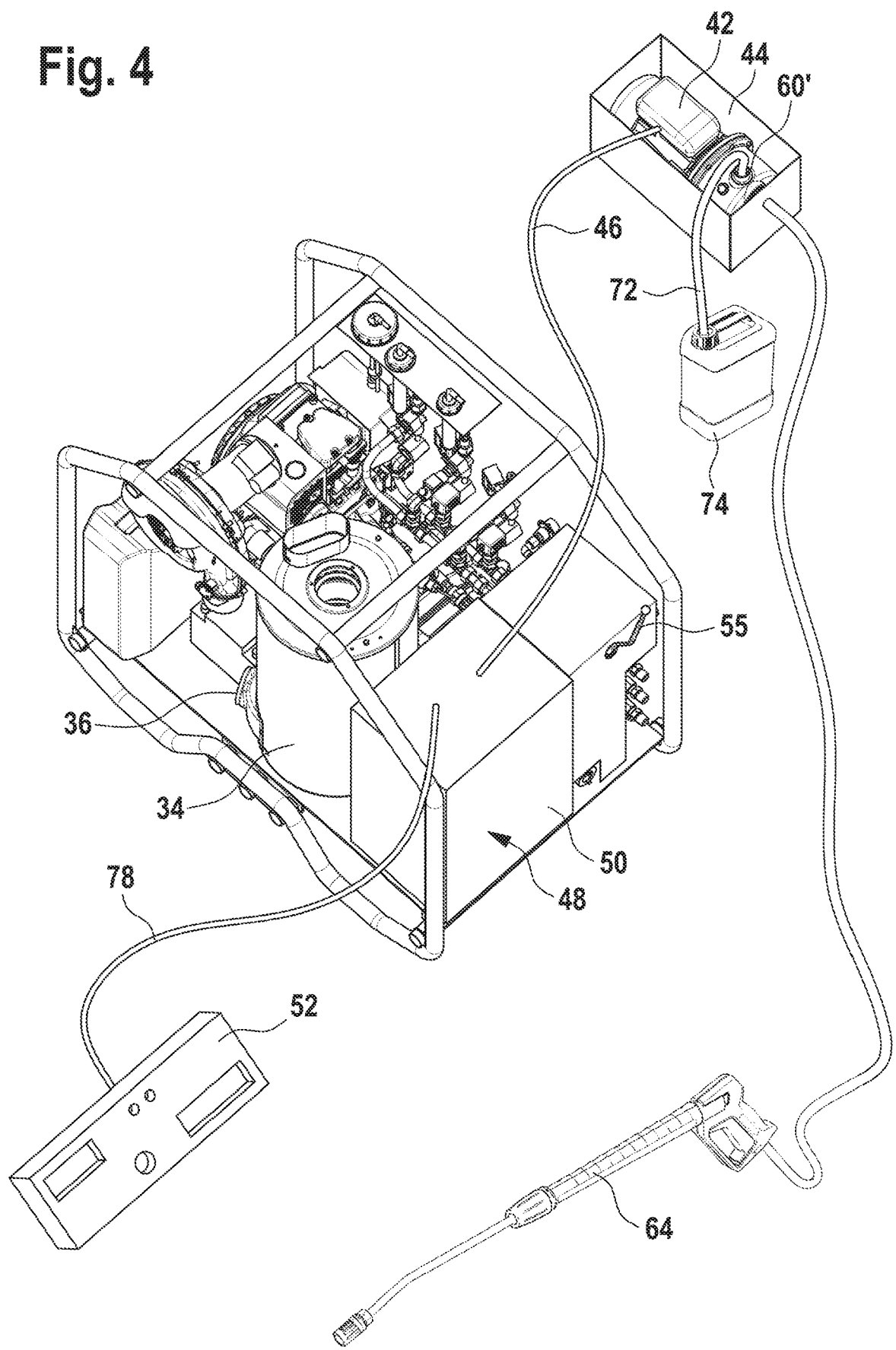
FIG. 4 shows the decontamination system from FIG. 1 in an optional operating situation.

Designated by reference number 34 (see FIG. 4) is a boiler which can heat a (first) decontamination agent with the aid of a burner 36. Shown at reference number 36 in FIG. 1 is a fan of the burner, while the burner itself is not shown here in more detail for reasons of clarity. In FIG. 4, the burner connector on the lower part of boiler 34 can be seen. In preferred exemplary embodiments, the first decontamination medium is water or an aqueous solution which is sucked in and fed to boiler 34 with the aid of first pump 24. In FIGS. 1 and 3, a connector 38 for sucking in the first decontamination medium 40 can be seen. In some operating scenarios, a hosepipe may be connected to connector 38 and may be led into a river, pond or into a water tank (not shown here).

Designated by reference number 42 is a second pump. In preferred exemplary embodiments, second pump 42 is an electrically operated chemical pump which is specifically designed for delivering non-aqueous decontamination media. This implies for example that all the parts which come into contact with the second decontamination medium may be constructed in stainless steel. As shown in FIG. 1, second pump 42 in preferred exemplary embodiments is arranged in a tub 44 which in its turn is situated in inner region 14 of tubular space frame 12. As is shown in FIG. 4, second pump 42 can be removed together with tub 44 from the inner region 14 of tubular space frame 12. Accordingly, pump 42 may be operated remotely from engine 16, generator 22 and first pump 24 as an option. Second pump 42 is advantageously connected via an electric cable 46 to power box 48. Accordingly, second pump 42 may receive operating current from generator 22 via power box 48 in some preferred exemplary embodiments.

In some preferred exemplary embodiments, power box 48 may include one or more converters which provide one or more operating voltages for operating second pump 42 and for operating further electrical units (not shown here). In some preferred exemplary embodiments, the operating voltages provided by power box 48 may include a 230-volt alternating voltage and/or a 400-volt three-phase voltage. Furthermore, power box 48 may include rectifiers which provide direct voltages of for example 3.5 volts, 5 volts, 12 volts and 24 volts, especially for system controller 50 (see FIG. 3) and operating panel 52. In preferred exemplary embodiments, system controller 50 is an electric programmable logic controller with an operating program permanently stored in a non-volatile system memory (not shown here). System controller 50 may be implemented on the basis of a commercially available PC running a commercially available operating system, such as Microsoft Windows or Linux. System controller 50, with the aid of the control program, may be especially designed for selectively operating first pump 24 and boiler 34 in one of at least two different operating modes. Furthermore, the system controller 50 may be designed for controlling engine 16 and second pump 42 in response to user inputs via operating panel 52.

By means of a simplified flow diagram, FIG. 3 shows certain essential functions of a novel decontamination system, which functions can be used alternatively or in combination with each other according to choice in some preferred embodiments. Same reference numbers identify the same elements as before.

In a first operating mode, system controller 50 may actuate first pump 24 so that first pump 24, via connector 38, sucks in a first decontamination medium 40, e.g. water, and feeds it to boiler 34. System controller 50 may also control burner 36 in order to heat decontamination medium 40 in boiler 34. Via a ball valve 54, which in certain exemplary embodiments may also be actuated by system controller 50, first decontamination medium 40 can be discharged in a single-lance operation or in a two-lance operation according to choice. In other exemplary embodiments, 54 ball valve may be operated manually, for example via a handle 55. In FIG. 3, a spray lance for a single-lance operation is shown in a simplified manner with reference number 56. Reference numbers 58a, 58b designate two spray lances which can be operated at ball valve 54 in parallel with each other.

In first operating mode, system controller 50 may actuate pump 24 so that pump 24 delivers a high volumetric flow through boiler 34. As a result of the high volumetric flow, decontamination medium 40 stays in heating boiler 34 only for a relatively short period. Decontamination medium 40 may thus be heated but does not reach its boiling point in the first operating mode. As a consequence, first decontamination medium may be discharged in liquid form in the first operating mode, e.g. as hot water at a temperature of approximately 60° C. In this first operating mode, decontamination system 10 can be used as a cleaning appliance in the manner of a high-pressure washer, wherein this washing may advantageously be used as pre-cleaning or post-cleaning in the course of a more complex decontamination process.

In a second operating mode, system controller 50 may actuate pump 24 in such a manner that the pump 24 delivers decontamination medium 40 through the boiler 34 with a lower volumetric flow. Due to longer residence time of decontamination medium 40 in boiler 34, decontamination medium 40 can be heated more intensely. In preferred exemplary embodiments, system controller 50 regulates the internal pressure in boiler 34 via first pump 24 and/or with the aid of a pressure release valve (not shown here). In preferred exemplary embodiments, decontamination medium 40, due to the internal pressure in boiler 34, can be heated above its boiling point at ambient pressure. Water as decontamination medium may for example be heated in the boiler 34 to more than 100° C. With discharge of the heated decontamination medium 40 from spray lance 56 and/or spray lances 58a, 58b, heated decontamination medium 40 may expand and become gaseous as a result. In other exemplary embodiments, decontamination medium 40 may already change over into the gaseous phase in boiler 34. In any case, decontamination medium 40 may be discharged in gaseous form with the aid of the spray lance 56 and/or spray lances 58a, 58b in the second operating mode. The second operating mode may particularly be suited for the disinfection of objects.

System controller 50 may also be designed for actuating the second pump 42 so that a second decontamination medium 62 may be sucked in via a second connector 60 using pump 42 and then be discharged with the aid of one or two spray lances 64a, 64b according to choice. In some preferred cases, second decontamination medium 62 may be a non-aqueous decontamination medium as is supplied for example under the brand name GDS2000 by Kärcher Futuretech GmbH, Germany.

In the exemplary embodiment shown in FIG. 1, decontamination system 10 may have a plurality of second connectors 60a, 60b for feeding second decontamination media. In some exemplary embodiments, connectors 60a, 60b may advantageously be used in order to mix a plurality of constituents with the aid of the first or second pump to form the first or second decontamination medium.

In some preferred exemplary embodiments, decontamination system 10 may have a connector arrangement 65 with connectors 66, 68, 70 to which the various spray lances can be connected for discharging various decontamination media. For example, connector 66 may be designed for connecting one of spray lances 64a, 64b in order to discharge second decontamination medium 62. Alternatively, in some exemplary embodiments, a Y-distributor (not shown here) may be connected to connector 66 in order to operate two spray lances 64a, 64b in parallel at connector 66.

One connector 68 of connector arrangement 65 may be designed for connecting one of connector lances 58a, 58b, or for optionally connecting a Y-distributor to which two spray lances 58a, 58b can then be connected in parallel for discharging first decontamination medium in liquid form (i.e. in the first operating mode). An additional connector 70 may be designed for connecting a spray lance, such as the spray lance 56, in order to discharge the first decontamination medium in the second operating mode in gaseous form.

As can be seen in FIG. 4, second pump 42 can be removed from inner region 14 of tubular space frame 12 and can be operated remotely from the other components. In this case, second pump 42 may advantageously be connected to a suction lance 72 by its connector 60'. Suction lance 72 may be inserted directly into the opening of a canister 74 from which the second pump 42 then sucks in a second decontamination medium and discharges it via the spray lance 64.

If second pump 42, however, is fastened in the inner region 14 of the tubular space frame 12, connector 60' may advantageously be closed off by means of a seal 76. Via a bayonet connector (not shown here) or another detachable hose connector, second pump 42 may then advantageously be connected to connector 60a, 60b and to connector 68 so that the second decontamination medium can be sucked in via connectors 60a, 60b and discharged via integrated connector 68.

As is further shown in FIG. 4, operating panel 52 may optionally be detached from tubular space frame 12. It may then be connected via a cable 78 with overlength to power box 48 and enable a remote control of decontamination system 10.

Figure 5:
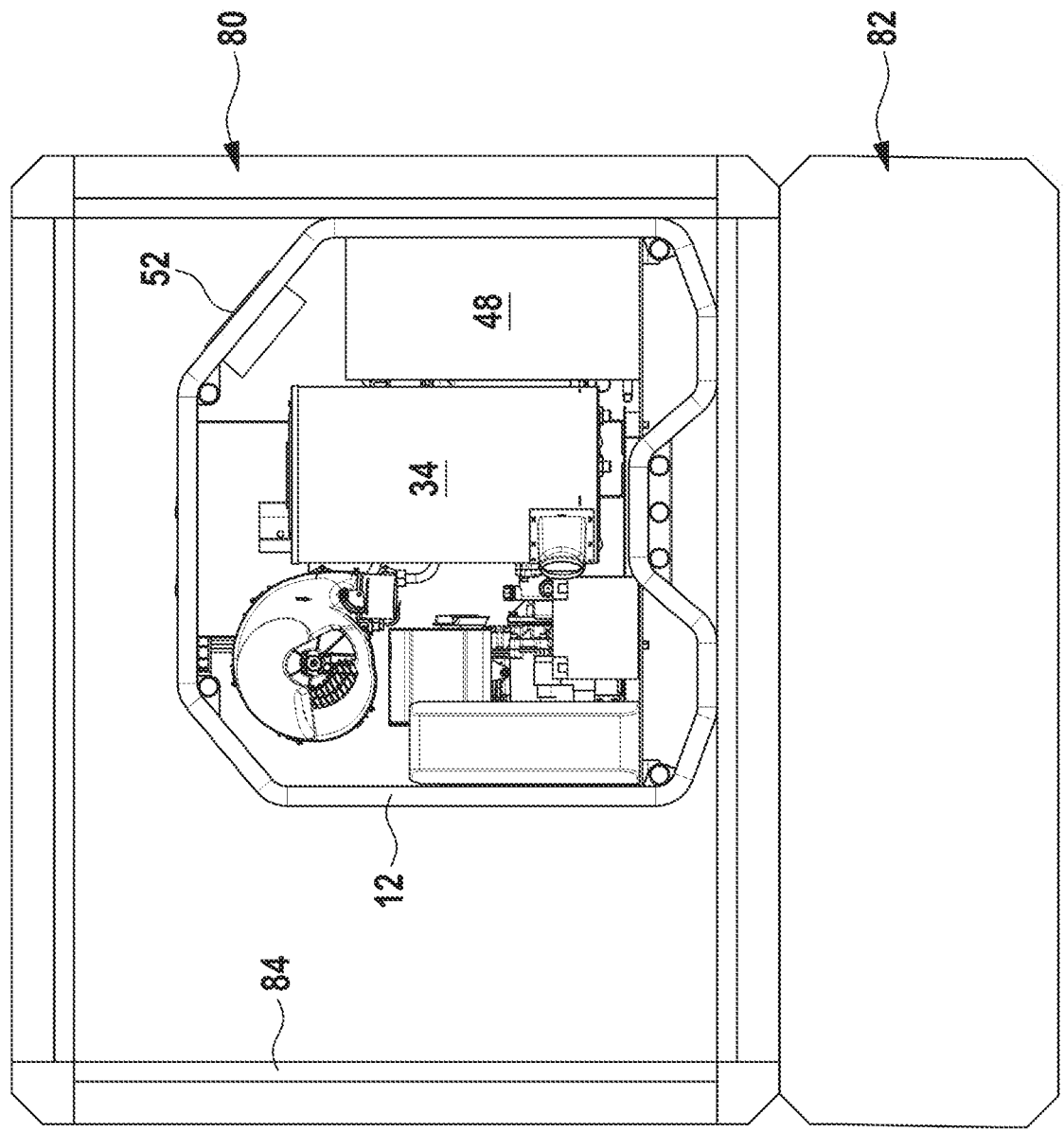
FIG. 5 shows the decontamination system from FIG. 1 in a variant with stackable transport containers.

As shown in FIG. 5, decontamination system 10 may have a first stackable transport container 80 and at least one second stackable transport container 82 of similar construction in some preferred exemplary embodiments, wherein the transport containers 80, 82 may advantageously be stacked one on top of the other. Transport containers 80, 82 may preferably have square frames 84 of similar construction with eight corner pieces and twelve edge profiles in each case, as is described in US 2016/276048 A1, which is incorporated here by reference. In some advantageous exemplary embodiments, a water tank (not shown here in more detail) may be accommodated in transport container 82.

Embodiments of the novel decontamination system may enable an operation with one or two first spray lances 58a, 58b, according to choice, for discharging a first decontamination medium, especially a liquid-aqueous decontamination medium. Two first spray lances 58a, 58b may advantageously be operated in parallel with each other in order to carry out a pre-cleaning and a post-cleaning in assembly line operation. In parallel with this, a second decontamination medium may be discharged with the aid of the second pump, and can advantageously be used for a main treatment. Two second spray lances 64a, 64b may be operated in parallel by decontamination system 10 according to choice.

Furthermore, a first decontamination medium may be heated to such a level that it is discharged in gaseous form. Second pump 42 may be integrated in the housing structure of decontamination system 10 or may be operated remotely according to choice.

In some exemplary embodiments, wheels (not shown here) may be fastened on tubular frame 12, especially by means of plug-in axles. Tubular frame 12 may have a plurality of axle sockets 86 for this.

Overall, the novel decontamination system enables a variable operation for a plurality of application scenarios so that a plurality of different decontamination tasks can be performed.

What is claimed is:
1. A mobile decontamination system for at least one of detoxification, disinfection or radiological decontamination, comprising
　a first spray lance and a second spray lance,
　an internal combustion engine having an engine housing and an engine shaft,
　a generator coupled to the engine shaft in order to generate electric power,
　a boiler configured for heating a first decontamination medium, the boiler having a de-fined heat output,
　a first pump coupled to the engine shaft and configured for discharging the first de-contamination medium from the boiler via the first spray lance,
　a second pump configured for discharging a second decontamination medium via the second spray lance,
　a system controller configured for selectively operating the first pump and the boiler in one of at least two different operating modes,
　wherein the first pump in the first operating mode produces a first volumetric flow of the first decontamination medium through the boiler, said first volumetric flow being at such a high level that the first decontamination medium is in liquid form at the defined heat output, and
　wherein the first pump in the second operating mode produces a second volumetric flow of the first decontamination medium through the boiler, which second volumetric flow is at such a low level that the first decontamination medium transfers into gaseous form at the defined heat output, and a connector arrangement with at least three connectors for spray lances, wherein a first connector is connected to the first pump and configured for detachably connecting the first spray lance for the first operating mode, wherein a second connector is connected to the second pump and configured for detachably connecting the second spray lance, and wherein an additional connector is connected to the first pump and configured for connecting an additional spray lance for the second operating mode.

2. The mobile decontamination system of claim 1, further comprising two first connectors which are each connected to the first pump and configured for selectively discharging the first decontamination medium via two first spray lances in parallel.

3. The mobile decontamination system of claim 2, wherein the system controller is configured for independently setting respective volumetric flow to a defined value at each of the two first connectors.

4. The mobile decontamination system of claim 1, wherein the second pump is connected to the second connector in an operationally detachable manner.

5. The mobile decontamination system of claim 1, further comprising a housing structure having an inner region, wherein the internal combustion engine, the heating boiler, the generator, the first pump and the second pump are arranged in the inner region of the housing structure.

6. The mobile decontamination system of claim 5, wherein the second pump is arranged in the inner region in an operationally detachable manner.

7. The mobile decontamination system of claim 5, further comprising an operating panel, wherein the operating panel is detachably mounted on the housing structure and connected via a cable to the system controller in an operationally permanent manner.

8. The mobile decontamination system of claim 5, further comprising a first stackable transport container accommodating the housing structure, and comprising a second stackable transport container accommodating a water tank.

9. The mobile decontamination system of claim 1, wherein the system controller is configured for selectively operating the second pump in parallel with the first pump.

10. The mobile decontamination system of claim 1, wherein the second pump is an electrically operated chemical pump.

11. The mobile decontamination system of claim 1, wherein the second pump is configured for delivering non-aqueous decontamination agents.

12. The mobile decontamination system of claim 1, wherein the engine shaft is coupled to the first pump on a first side of the engine housing and is coupled to the generator on a second side of the engine housing, which second side faces away from the first side.

13. The mobile decontamination system of claim 1, wherein the generator, the engine shaft and the first pump are arranged along a common spatial axis.

14. The mobile decontamination system of claim 1, wherein the generator and the first pump are coupled to the engine shaft in a beltless manner.

15. The mobile decontamination system of claim 1, further comprising a gear via which the first pump is coupled to the engine shaft.

16. The mobile decontamination system of claim 15, wherein the generator, the gear and the first pump are arranged along a common spatial axis.

17. The mobile decontamination system of claim 1, further comprising a magnetic clutch via which the first pump is coupled to the engine shaft.

18. The mobile decontamination system of claim 17, wherein the generator, the magnetic clutch and the first pump are arranged along a common spatial axis.

19. The mobile decontamination system of claim 1, wherein the second pump is operationally coupled to the generator in order to receive electric power from the generator.

* * * * *